July 29, 1924.
W. H. HOLLANDER ET AL
ANTIGLARE HEADLIGHT
Filed May 31, 1923    2 Sheets-Sheet 1
1,502,723
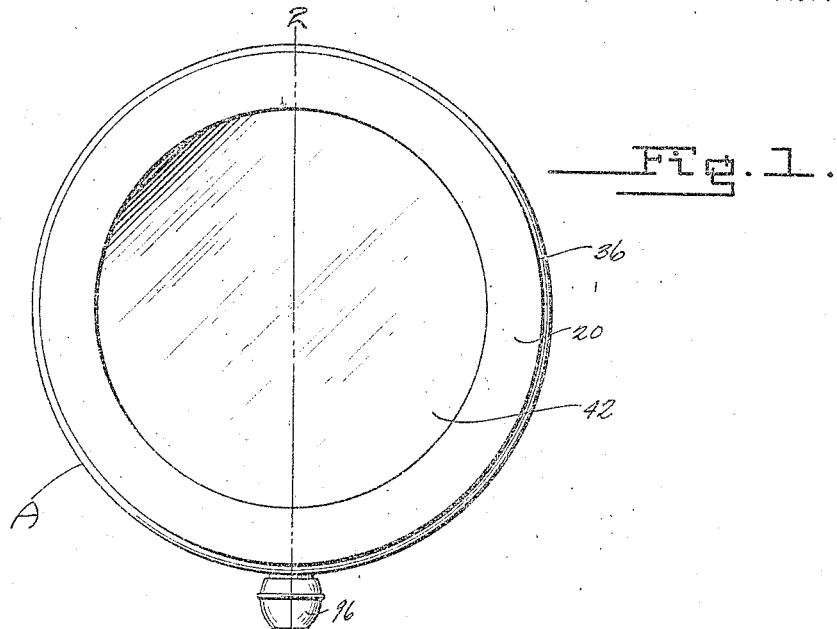
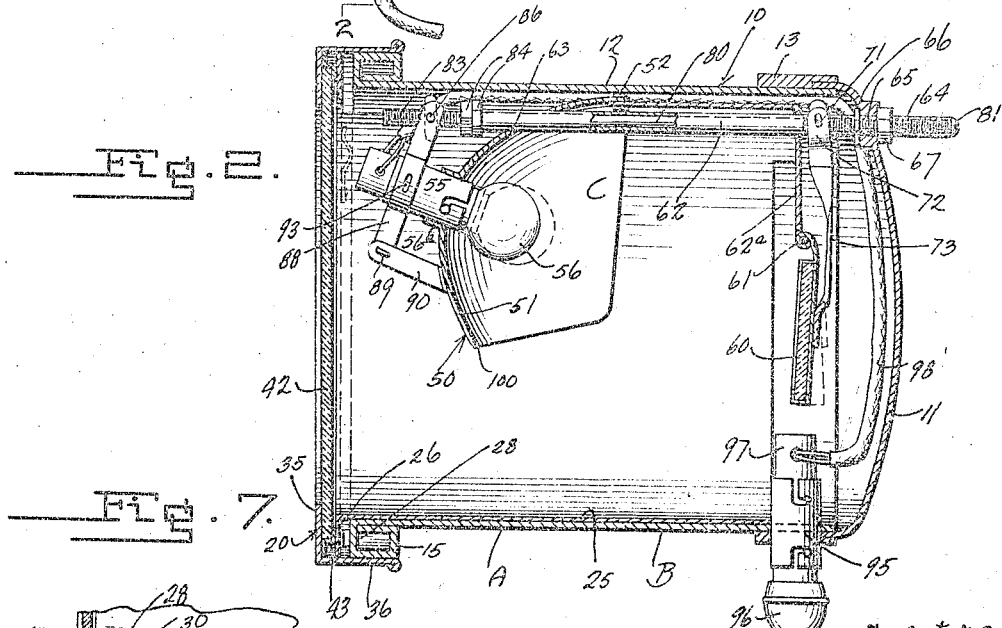
Inventors
William H. Hollander
Frederic K.W. Hollander
Gus. Hollander
By Lancaster and Allwein
Attorneys

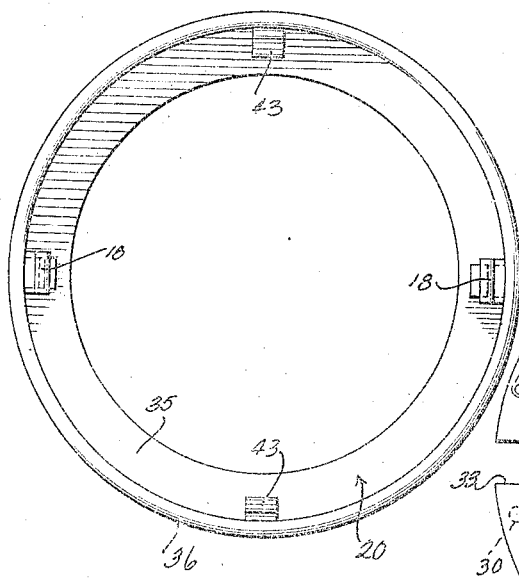
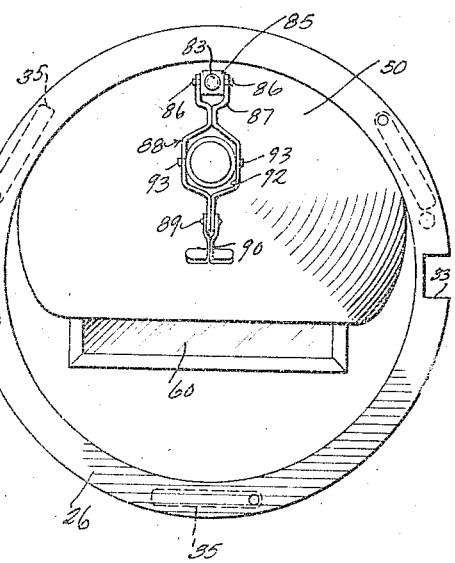
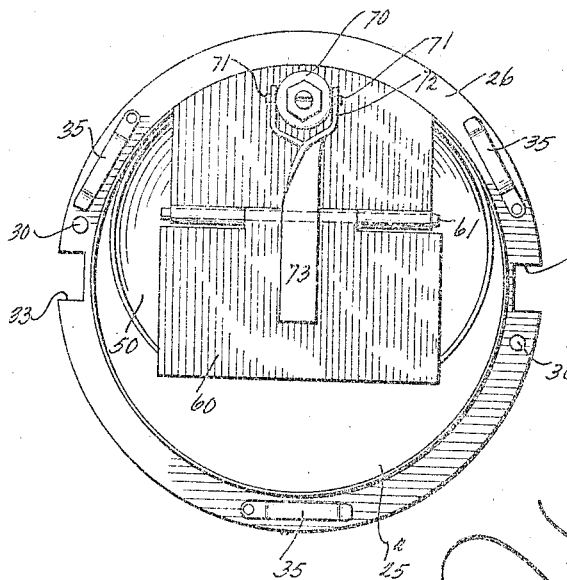
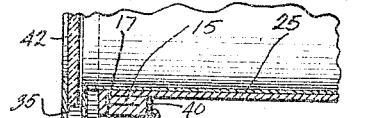

Patented July 29, 1924.

1,502,723

UNITED STATES PATENT OFFICE.

WILLIAM H. HOLLANDER, FREDERICK W. HOLLANDER, AND GUS HOLLANDER, OF PORT ARTHUR, TEXAS.

ANTIGLARE HEADLIGHT.

Application filed May 31, 1923. Serial No. 642,620.

*To all whom it may concern:*

Be it known that we, WILLIAM H. HOLLANDER, FREDERICK W. HOLLANDER, and GUS HOLLANDER, citizens of the United States, residing at Port Arthur, in the county of Jefferson and State of Texas, have invented certain new and useful Improvements in Antiglare Headlights, of which the following is a specification.

This invention relates to improvements in anti-glare headlights.

The primary object of this invention is the provision of a lamp, such as is ordinarily used for a head light upon automotive vehicles, embodying improved means whereby the light rays therefrom may be controlled so that the same will emanate therefrom in anti-glare manner.

A further object of this invention is the provision of an anti-glare headlight for general use, such as upon automotive vehicles, by means of which light rays may be adjusted as to their emanation from the headlights, so that the same will be directed downwardly, or in any other direction desired, so that the same will not glare directly into the vision of approaching traffic.

A further object of this invention is the provision of a novel means associated with an anti-glare headlight for control of light rays.

Other objects and advantages of this invention will be apparent during the course of the following detailed description.

In the accompanying drawings, forming a part of this specification, and wherein similar reference characters designate corresponding parts throughout the several views:

Figure 1 is a front elevation of the improved headlight.

Figure 2 is a longitudinal cross sectional view, taken through the improved headlight, showing improved features of a construction thereof, taken on the line 2—2 of Figure 1.

Figure 3 is an inside view of a retaining cap associated with the headlight.

Figure 4 is a front view of an inner casing of the headlight, showing the essential features of the light controlling means as carried thereby.

Figure 5 is a rear view of the details illustrated in Figure 4.

Figure 6 is a fragmentary view, partly in cross section, showing more particularly a cap retaining device for the housing of the headlight.

Figure 7 is a fragmentary cross sectional view, showing cooperating details of the housing of the improved headlight.

In the drawing, wherein for the purpose of illustration is shown but the preferred embodiment of this invention, the letter A may generally designate the headlight, which may include a housing construction B; and means C for controlling the light rays in so far as their passage from the housing B is concerned.

Referring to the housing B, the same preferably includes the outer cylindrical shaped casing 10, which is entirely open forwardly thereof, and at its rear end is provided with a closure 11 which may be retained upon the body 12 of the casing 10, as by means of a retaining ring 13. Forwardly of the outer casing, the same is preferably outwardly flanged, as at 15, in annular manner, said flange being polygonal shaped in cross section, and preferably having a pair of oppositely positioned grooves or recesses 17 extending transversely through the crimped flanged portion 15, which receive certain retaining springs 18 of a retaining cap 20 associated with the casing 10, as will be subsequently described.

The housing B also preferably includes an inner casing 25, preferably of cylindrical shell formation, which may be entirely open at its rear end, and at its forward end is provided with an outwardly extending annular flange 26, adapted when the cylindrical shell 25 is slipped within the outer casing 10 to be positioned over the forward face 28 of the annular flange portion of said housing or casing 10.

Upon the inner or rear surface of the flange 26, it is preferred to provide pins 30, extending rearwardly from the plane of the flange 26, which may engage through suitable openings 31 in the forward face portion 28 of the flange 15, so that the inner shell may always have a definite position relative to the outer casing 10. Transverse grooves 33 are diametrically opposed and transversely provided in the flange 26, which when the shell 25 is assembled within the casing 10, align with the transverse openings 17 in the flange 15 of the casing 10. Bowed springs 35 are preferably provided upon the inner surface of the flange 26, for abutment against the flange face 28, so that there will be no liability of collapsing of parts of the housing B when assembled as hereinafter to be described. The attaching cap 20 is preferably of ring shaped formation, including the front flange 35, and the annular flange 36. The annular flange 36 is, of course, of sufficient diameter to just fit over the crimped portion 15 of the casing 10, and as a retaining feature, the same is provided with the retaining springs 18 upon the inner periphery of said annular flange 36, which springs are connected at their inner ends adjacent the front flange 35 and are outwardly rolled upon their free ends so that when said retaining springs are slid through the aligning recesses 33 and 17 said rolled portions will rest against the rear surface 40 of the annular flange portion 15, and thus prevent any accidental detachment of the retaining cap or ring 20 with respect to the other housing details. It is preferred to provide a transparent plate 42, preferably of disc formation, for support upon the front flange 35 of the retaining member 20, as by supporting brackets 43. Packing may be provided for maintaining this plate in position so that the same may be clamped in non-breakable position intermediate the front flange 35 and the shell flange 26.

Referring to the means C for controlling light rays so that the same may pass through the glass front 42, in anti-glare manner, the inner shell 25 may appropriately be included as a part thereof, since the details of the means C are mainly supported thereby. A segmental concavo-convex reflector 50 is forwardly mounted in the inner shell 25, so that the concaved reflecting surface 51 thereof faces to the rear. It is preferred that the reflector 50 be bolted or otherwise secured, as at 52, to the top of the shell 25, so that the reflector 50 depends interiorly of said shell 25 as above outlined. A socket 55, adapted to detachably receive a bulb 56, is reciprocably carried substantially centrally of the reflector 50, through an opening provided by an annular flange 56ª of said reflector, so that the bulb 56 fits within the pocket provided by the reflector 50, whereby rays of light may reflect from the concaved surface 51, as will be subsequently described. A second reflector 60, of any approved type, although preferably a mirror, is hingedly supported, as at 61, at the lower end of a flange 62ª which depends from the top of the shell 25. The rays of light from the bulb 56, directly, as well as by deflection from the reflector 50, will strike the mirror surface of the reflector 60 for deflection therefrom forwardly through the transparent disc 42.

So that the rays of light emanating from the headlight may be elevated or lowered as desired, a tubular member 62 is adjustably carried within the housing B, being horizontally supported therein at the top thereof. At the forward end, the tube 62 extends through an opening 63 in the front reflector 50. At the rear end it is preferably screw threaded, as at 64 slidably extending through an opening 65 in the rear end 11 of the outer casing 10. Inner and outer clamping nuts 66 and 67 are preferably provided upon the screw threaded portion 64, whereby the tube 62 may be maintained in a desired position with respect to the housing B. A nut 70 is adjustably positioned upon the screw threaded end 64, within the housing B, providing oppositely extending pin portions 71 pivotally and slidably receiving the bifurcated end 72 of an arm 73, which depends within the housing B at the rear end thereof, and is rigidly connected to the rear of the inner reflector 60. It is obvious that upon rotation of the tube 62 within the housing B, the nut 70 may be fed along the said tube 62, incident to its screw threaded engagement therewith, whereby the plane of the reflector 60 may be inclined to effect the passage of rays from the housing B.

A pin or shaft 80 is rotatably carried within the tube 62, with its rear end extending from the screw threaded portion 64 of said tube and providing a screw head 81 thereon. The shaft 80 extends entirely through the tube, and at the forward end of the tube extends therefrom and provides a screw threaded portion 83. Lock nuts 84 are provided upon the screw threaded portion 84 adapted for abutment against the forward end of the tube 62 to define a proper position of the shaft 80 within the tube 62 against longitudinal movement with respect thereto. A nut 85 is adjustably carried by the screw threaded portion 83 of the shaft 80 having oppositely extending pin extensions 86 thereon which pivotally receive a bifurcated end 87 of a rocker arm 88, which is pivoted, as at 89, at its lower end, to a bracket 90 rigid with the forward reflector 50. Intermediate its ends, the rocker member 88 is enlarged, providing an opening 92 for receiving the reciprocable socket 55, having a pin and slot connection 93 therewith, whereby upon rocking movement of the arm 88, the socket 55 may be slid rearwardly or forwardly within the reflector 50.

At the lower rear end of the housing B, it is preferred to provide a socket 95, which may exteriorly and interiorly of the housing B have electric connectors or plugs 96 and 97. A cable 98 extends from the plug 97 within the housing B, rearwardly and upwardly therealong for electrical connection with the reciprocable socket 55 with which the bulb 56 is in electrical connection.

Referring to the operation of this invention, the rays of light passing from the bulb 56 and from the reflector 50, are deflected from the reflector 60 through the plate 42 of the headlight A. The lower marginal edge 100 of the forward reflector 50 is so positioned that rays reflected from the rear reflector 60, passing from the headlight A between said marginal edge 100 and the lower surface of the inner casing 25 cannot glare directly in the vision of approaching traffic. Bulb 56 may be moved toward the reflector 60, merely by rotation of the shaft 80 through the screw head 81, which has the effect of feeding the nut 85 along the shaft screw threaded end 83, so that the arm or member 88 is rocked upon the pivot 89 to move the electric socket 55 in or out with respect to the reflector 50. As above mentioned, the plane of the rear reflector 60 may be varied, for controlling the deflecting of rays therefrom past the front reflector 50 and through the headlight plate 42.

From the foregoing description of this invention, it will be apparent that a relatively simple and compact type of headlight has been provided, the rays of which may be controlled as far as passage from the headlight is concerned, so that they are directed downwardly as in the case of an automotive vehicle and will tend to rather illuminate a road surface than glare into the vision of approaching traffic. While the headlight is primarily adapted for vehicles, it may be used in other connections, such as upon watercraft, air craft and the like.

Various changes in the shape, size and arrangement of parts may be made to the form of invention herein shown and described without departing from the spirit of the invention or the scope of the claims.

We claim:

1. A headlight comprising a casing, a forward reflector within the casing, a lamp reciprocably mounted within the forward reflector so that the rays of light therefrom may not pass directly through the casing, a shaft rotatable upon the casing having a screw threaded end, a nut upon said screw threaded end, a rocker arm carried by said reflector and by said nut engaging said lamp whereby upon rotation of the shaft the nut may be fed therealong for moving said lamp inwardly and outwardly with respect to said reflector, and reflecting means to the rear within said casing adapted to receive rays of light from said lamp thereagainst for reflection from the casing indirectly.

2. A headlight comprising a casing having a forward opening therein, a concavo-convex reflector forwardly carried within the casing having its concaved reflecting surface facing to the rear within said casing, a socket reciprocably carried centrally of the reflector, a bulb carried by the socket within the reflector whereby rays of light will be deflected from said reflector to the rear within said casing, a rear reflector pivotally mounted within the casing and at the rear thereof adapted to receive direct rays of light from said bulb, a tubular member rotatably mounted within the casing having a screw threaded portion thereon, a nut adjustable on said screw threaded portion, an arm carried by said rear reflector and movable with said nut whereby the plane of the rear reflector may be adjusted, a shaft rotatable in said tubular member having a screw threaded end within the casing and an adjusting portion exteriorly of the casing, a nut adjustable on the screw threaded end of said shaft, and a rocker arm supported by the forward reflector and movable with said nut and engaging the socket carried by said forward reflector whereby upon rotation of said shaft the socket may be fed inwardly or outwardly with respect to the reflector upon which it is mounted.

3. A headlight comprising a housing structure, a reflector carried within the housing structure having a reflecting surface facing to the rear within the housing structure, a second reflector movably carried within the housing structure to the rear of the first mentioned reflector, a tube rotatably supported by said housing structure having a screw threaded portion thereon, a nut for said tube, means carried by said nut and connected to said second mentioned reflector for moving the same upon movement of said nut incident to rotation of said tube, a shaft rotatably mounted within said tube having a screw threaded end projecting forwardly of the tube, a nut for said screw threaded forward end of the shaft, a source of light movably carried by the first mentioned reflector, and means connecting said source of light with said nut so that the source of light may be focused incident to adjustment of the nut along said screw threaded shaft.

4. In a headlight structure of the class described the combination of a housing structure, a forward reflector in the housing structure, a rear reflector in the housing structure, a tube rotatably carried by the housing structure, a shaft rotatable within said tube, a source of light movably carried by the first reflector, means connecting said source of light to said shaft so that incident to rotation of said shaft the source of light may be focused with respect to said rear reflector, and means connecting said rear reflector with said tube whereby upon rotation of the tube the rear reflector may be adjusted with respect to said source of light.

5. In an anti-glare headlight the combination of an outer housing including side and rear walls and being open forwardly thereof, a hollow substantially cylindrical shaped shell adapted to be received in the outer housing through the forward opening in the latter and being open at both ends thereof, a front reflector forwardly carried within the shell having its reflecting surface facing to the rear within the housing, a rear reflector movably supported by the shell with a reflecting surface facing forwardly in the housing, a lamp carried to the rear of the front reflector reflecting surface, and means supported by the rear wall of the housing for adjusting the position of the rear reflector whereby rays of light may be controlled as to their passage through the front opening of the housing.

6. In an anti-glare headlight the combination of an outer housing including side and rear walls and being open forwardly thereof, a hollow substantially cylindrical shaped shell adapted to be received in the outer housing through the forward opening in the latter and being open at both ends thereof, a front reflector forwardly carried within the shell having its reflecting surface facing to the rear within the housing, a rear reflector movably supported by the shell with a reflecting surface facing forwardly in the housing, a lamp carried to the rear of the front reflector reflecting surface, means supported by the rear wall of the housing for adjusting the position of the rear reflector whereby rays of light may be controlled as to their passage through the front opening of the housing, a lens adapted to be placed forwardly over the front opening in said housing, and means for locking said lens in said position to retain the shell within said housing.

WILLIAM H. HOLLANDER.
FREDERICK W. HOLLANDER.
GUS HOLLANDER.